US008190404B2

(12) United States Patent
Ramsay et al.

(10) Patent No.: US 8,190,404 B2
(45) Date of Patent: May 29, 2012

(54) COMPUTATIONAL RADIATOR FLOW DISTRIBUTION METHOD (75) Inventors: Thomas N. Ramsay, Raymond, OH (US); Kurt Zielinski, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 925 days.

(21) Appl. No.: 12/229,777

(22) Filed: Aug. 26, 2008

(65) Prior Publication Data
US 2009/0063116 A1 Mar. 5, 2009

Related U.S. Application Data (60) Provisional application No. 60/966,476, filed on Aug. 27, 2007, provisional application No. 61/020,660, filed on Jan. 11, 2008.

(51) Int. Cl.
*G06F 17/50* (2006.01)
(52) U.S. Cl. .............. 703/2; 703/5; 703/11; 702/49; 348/135; 382/103; 73/202.5
(58) Field of Classification Search .............. 703/2, 5; 702/49; 348/135; 73/202.5; 382/103
See application file for complete search history.

(56) References Cited

U.S. PATENT DOCUMENTS

| | | | | |
|---|---|---|---|---|
| 5,789,673 A * | 8/1998 | Igarashi et al. | .............. | 73/202.5 |
| 5,901,672 A | 5/1999 | Suzuki et al. | | |
| 6,189,379 B1 * | 2/2001 | Igarashi et al. | ................ | 73/202 |
| 6,209,794 B1 | 4/2001 | Webster et al. | | |
| 6,657,860 B2 * | 12/2003 | Matsui et al. | ................ | 361/695 |
| 6,832,644 B2 | 12/2004 | Stauder et al. | | |
| 7,663,754 B2 * | 2/2010 | Okcay et al. | .................. | 356/432 |
| 7,818,894 B2 * | 10/2010 | Noyes et al. | .................... | 34/169 |
| 7,880,883 B2 * | 2/2011 | Okcay et al. | .................. | 356/432 |
| 7,971,479 B2 * | 7/2011 | Hoshika et al. | .............. | 73/202.5 |
| 2005/0171749 A1 | 8/2005 | Watanabe et al. | | |
| 2009/0027494 A1 * | 1/2009 | Cavallaro et al. | ............. | 348/135 |
| 2009/0028385 A1 * | 1/2009 | Cavallaro et al. | ............. | 382/103 |
| 2009/0107230 A1 * | 4/2009 | Okcay et al. | .................... | 73/148 |
| 2009/0234595 A1 * | 9/2009 | Okcay et al. | .................... | 702/49 |

OTHER PUBLICATIONS

Chacko, S. et al., "Numerical Simulation for Improving Radiator Efficiency by Air Flow Optimization," [Online] [Retrieved Mar. 22, 2008] Retrieved from the Internet <URL:http://www.beta-cae.gr/05_chacko_radiator_efficiency_paper.pdf>.
Witry, A. et al., "CFD Analyses of Fluid Flow and Heat Transfer in Patterned Roll-Bonded Aluminium Plate Radiators," Third International Conference on CFD in the Minerals and Process Industries CSIRO, Dec. 10-12, 2003, pp. 253-258, Melbourne, Australia.

* cited by examiner

*Primary Examiner* — Thai Phan
(74) *Attorney, Agent, or Firm* — Fenwick & West LLP; Mark Duell (57) ABSTRACT

The present invention provides a method for analyzing airflow through a vehicle radiator and identifying how cooling openings in the vehicle affect airflow through the vehicle radiator. A plurality of pathlines each describing airflow through a vehicle front end and including a position identifier and velocity magnitude are computed. A plurality of intersection points are calculated to identify locations within a vehicle radiator that intersect with a generated pathline to identify pathlines from which air flows through the vehicle radiator. One or more elements are generated from the intersection points using a triangulation method, such as Delauney triangulation, so that the generated elements include intersection points as nodes and are non-overlapping. An airflow rate is calculated for each element based on the velocity magnitudes of the pathlines associated with the intersection points included in the element and the element area.

26 Claims, 9 Drawing Sheets
(7 of 9 Drawing Sheet(s) Filed in Color)

COMPUTATIONAL RADIATOR FLOW DISTRIBUTION METHOD

RELATED APPLICATIONS

This application claims priority, under 35 U.S.C. §119(e), from U.S. provisional application No. 60/966,476, filed on Aug. 27, 2007, and U.S. provisional application No. 61/020,660, filed on Jan. 11, 2008 which are both incorporated by reference herein in their entirety.

FIELD OF THE INVENTION

This invention relates generally to analysis of vehicle airflow, and more particularly to a system and method for calculating airflow rate distribution through a vehicle radiator.

BACKGROUND OF THE INVENTION

To improve vehicle performance, various types of internal and external aerodynamic flow conditions affecting a vehicle, such as drag/lift, underhood/underbody, heating, air conditioning, fuel slosh and intake or exhaust are tested or modeled. Of particular importance is analysis of airflow through a vehicle radiator. As airflow affects the radiator's ability to dissipate heat from the engine, radiator airflow analysis allows for improved cooling of the engine. A vehicle includes one or more cooling openings, such as grilles, from which air travels through the radiator, allowing heat from warm coolant in the radiator to be transferred to the moving air, enabling recirculation of the coolant through the engine to extract more heat. By analyzing the amount of airflow from each cooling opening to the radiator, the cooling openings can be repositioned or reshaped to improve radiator heat dissipation by increasing airflow through the radiator to more efficiently transfer heat from coolant within the radiator to the moving air.

However, in conventional radiator airflow analysis, airflow from various cooling openings is analyzed by covering the cooling openings in various combinations and using anemometers to measure the change in airflow through the radiator based on covering different cooling openings. However, selectively covering cooling openings does not accurately capture the airflow contribution from each cooling opening during driving conditions. A low-pressure region is created behind the covered cooling opening, causing airflow from an uncovered cooling opening to be redirected from the uncovered cooling opening to the low-pressure region. This airflow redistribution into the low pressure region creates an airflow distribution from different cooling openings that does not accurately depict airflow from the cooling openings during driving conditions.

A different method for airflow analysis more accurately depicts airflow through the radiator during normal driving conditions with all cooling openings uncovered. In particular, using computational fluid dynamics (CFD) allows accurate simulation of airflow during driving conditions with uncovered cooling openings. As CFD analysis is resource-driven, increasing the amount of available resources allows more detailed, and consequently more accurate, analysis of airflow through a radiator. Hence, optimizing the resources used for CFD analysis allows for accurate simulation of airflow rate from each cooling opening through the radiator during driving conditions.

Hence, what is needed is a system and method for efficient application of CFD analysis to simulate airflow through a vehicle radiator.

SUMMARY OF THE INVENTION

The present invention provides a method for analyzing airflow through a vehicle radiator and identifying how cooling openings in the vehicle affect airflow through the vehicle radiator. In one embodiment, a plurality of pathlines each describing airflow through a vehicle front end are generated. Each pathline includes a position identifier and a velocity magnitude, which identify the pathline's location within the vehicle front end and the rate at which air flows along the pathline, respectively. For example, a computational fluid dynamics model is generated and solved for a specific speed to generate pathlines which describe airflow at a specific vehicle velocity. A plurality of intersection points are calculated which identify locations within a vehicle radiator where pathlines intersect the vehicle radiator. Hence, the intersection points identify pathlines flowing through the vehicle radiator and the location of the vehicle radiator intersected by the pathline. One or more elements are then generated from the intersection points. For example, a triangulation method, such as Delauney triangulation, is used to generate multiple triangular elements each having a plurality of intersection points as nodes. An airflow rate is calculated for each element, describing how each element contributes to airflow through the radiator. In one embodiment, the velocity magnitudes of the pathlines associated with the intersection points included in an element are averaged and multiplied by the element area to determine the flow rate associated with the element. The flow rates associated with multiple elements are then combined to generate a report describing flow rate through a region of the vehicle radiator including one or more elements, which is subsequently stored.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

A preferred embodiment of the present invention is now described with reference to the Figures where like reference numbers indicate identical or functionally similar elements. Also in the Figures, the left most digits of each reference number correspond to the Figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

Figure 1:
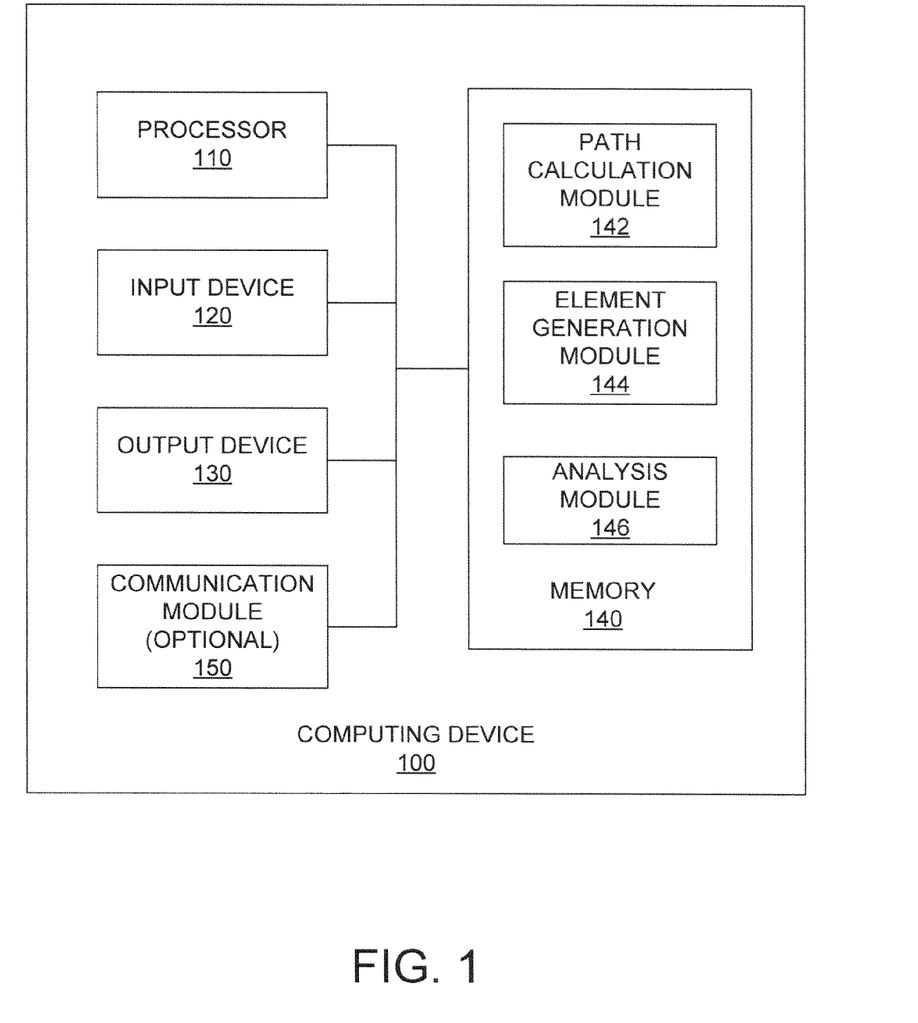
FIG. 1 is an illustration of a computing device in which one embodiment of the present invention operates.

FIG. 1 is an illustration of a computing device 100 in which one embodiment of the present invention may operate. The computing device 100 comprises a processor 110, an input device 120, an output device 130 and a memory 140. In an embodiment, the computing device 100 further comprises a communication module 150 including transceivers or connectors.

The processor 110 processes data signals and may comprise various computing architectures including a complex instruction set computer (CISC) architecture, a reduced instruction set computer (RISC) architecture, or an architecture implementing a combination of instruction sets. Although only a single processor is shown in FIG. 1, multiple processors may be included. The processor 110 comprises an arithmetic logic unit, a microprocessor, a general purpose computer, or some other information appliance equipped to transmit, receive and process electronic data signals from the memory 140, the input device 120, the output device 130 or the communication module 150.

The input device 120 is any device configured to provide user input to the computing device 100 such as, a cursor controller or a keyboard. In one embodiment, the input device 120 can include an alphanumeric input device, such as a QWERTY keyboard, a key pad or representations of such created on a touch screen, adapted to communicate information and/or command selections to processor 110 or memory 140. In another embodiment, the input device 120 is a user input device equipped to communicate positional data as well as command selections to processor 110 such as a joystick, a mouse, a trackball, a stylus, a pen, a touch screen, cursor direction keys or other mechanisms to cause movement adjustment of an image.

The output device 130 represents any device equipped to display electronic images and data as described herein. Output device 130 may be, for example, an organic light emitting diode display (OLED), liquid crystal display (LCD), cathode ray tube (CRT) display, or any other similarly equipped display device, screen or monitor. In one embodiment, output device 120 is equipped with a touch screen in which a touch-sensitive, transparent panel covers the screen of output device 130.

The memory 140 stores instructions and/or data that may be executed by processor 110. The instructions and/or data may comprise code for performing any and/or all of the techniques described herein. Memory 140 may be a dynamic random access memory (DRAM) device, a static random access memory (SRAM) device, Flash RAM or other non-volatile storage device, combinations of the above, or some other memory device known in the art. In an embodiment, the memory 140 comprises a path calculation module 142, an element generation module 144 and an analysis module 146, and is adapted to communicate with the processor 110, the input device 120, the output device 130 and/or the communication module 150.

The path calculation module 142 provides information, such as an image or other data describing the motion of one or more fluid particles through or around a surface. For example, the path calculation module 142 produces one or more pathlines depicting fluid flow around and/or through the surface. In an embodiment, the path calculation module 142 receives input from the input device 120 and/or the communication module 150 describing the surface used in pathline generation. For example, the path calculation module 142 receives data describing a vehicle surface, such as a front grille or vehicle front end including one or more cooling openings, and one or more parameters, such as a vehicle operating speed. The description of the vehicle surface can be modified by user input, allowing evaluation of how changes to the vehicle front end, such as changes in cooling opening positioning or shape or modification of front end position, affect airflow through and/or around the cooling openings. For example, the pathlines show changes in airflow through the cooling openings based on changes to the vehicle surface In an embodiment, using the description of the vehicle front end, the path calculation module 142 generates a computational fluid dynamics (CFD) model including the vehicle front end and solves the CFD model at a specified speed, such as 55 miles per hour, 65 miles per hour or other driving speed, to identify pathlines describing airflow through the cooling openings and into the vehicle engine compartment. As the CFD model simulates the interaction of fluid with the described surface or surfaces, the generated pathlines describe the interaction between moving air and the vehicle front end and show how fluid, such as moving air, enters one or more cooling openings on the vehicle front end. In an embodiment, the pathline generation module 142 associates different pathlines with different cooling openings to indicate a relationship between cooling openings and different pathlines. For clarity, FIG. 3, further described below, depicts an example of pathline generation identifying the cooling openings where different pathlines originate.

Figure 4:
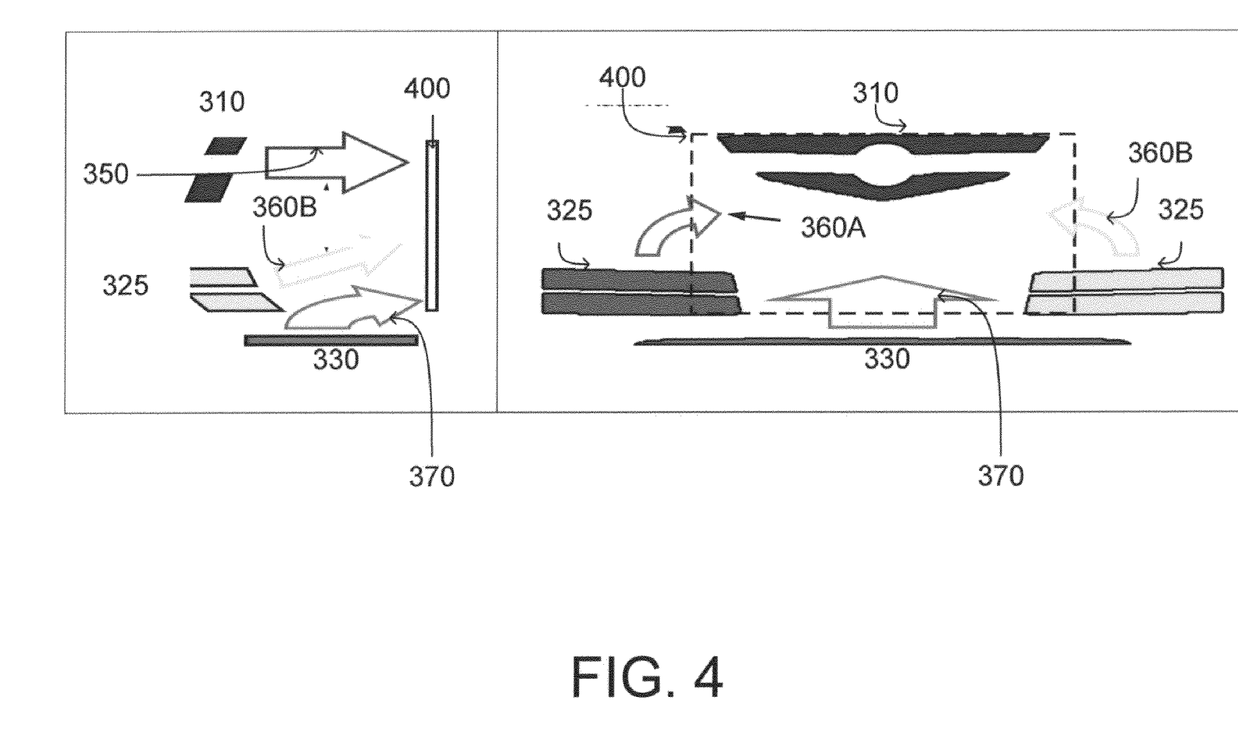
FIG. 4 is another example of pathline generation indicating airflow from cooling openings to a vehicle radiator according to one embodiment of the present invention.

The path calculation module 142 also stores the generated pathlines as well as coordinates and velocity magnitudes associated with each pathline. This allows identification of where various pathlines originate and how each pathline contributes to airflow through the vehicle front end. When the pathlines are associated with a cooling opening, the velocity magnitude also indicate how each cooling opening contributes to airflow through the vehicle through examination of the velocity magnitudes of various pathlines associated with different cooling openings. The path generation module 142 also determines or receives the location and shape of a radiator which is positioned posterior to the vehicle front end and identifies points at which pathlines intersect the radiator ("intersection points"). Hence, the path calculation module 142 identifies which pathlines intersect the radiator and the location of the radiator where the pathline intersects the radiator. This allows the path calculation module 142 to indicate the pathlines contributing to airflow through the vehicle radiator. When pathlines are associated with various cooling openings, the intersection points also allow determination of how different cooling openings contribute to airflow through the radiator. FIG. 4, further described below, shows an example of pathlines from cooling openings to vehicle radiator. Also, FIG. 5, which is further described below, shows an example of intersection points identifier by the path generation module 142.

Figure 6:
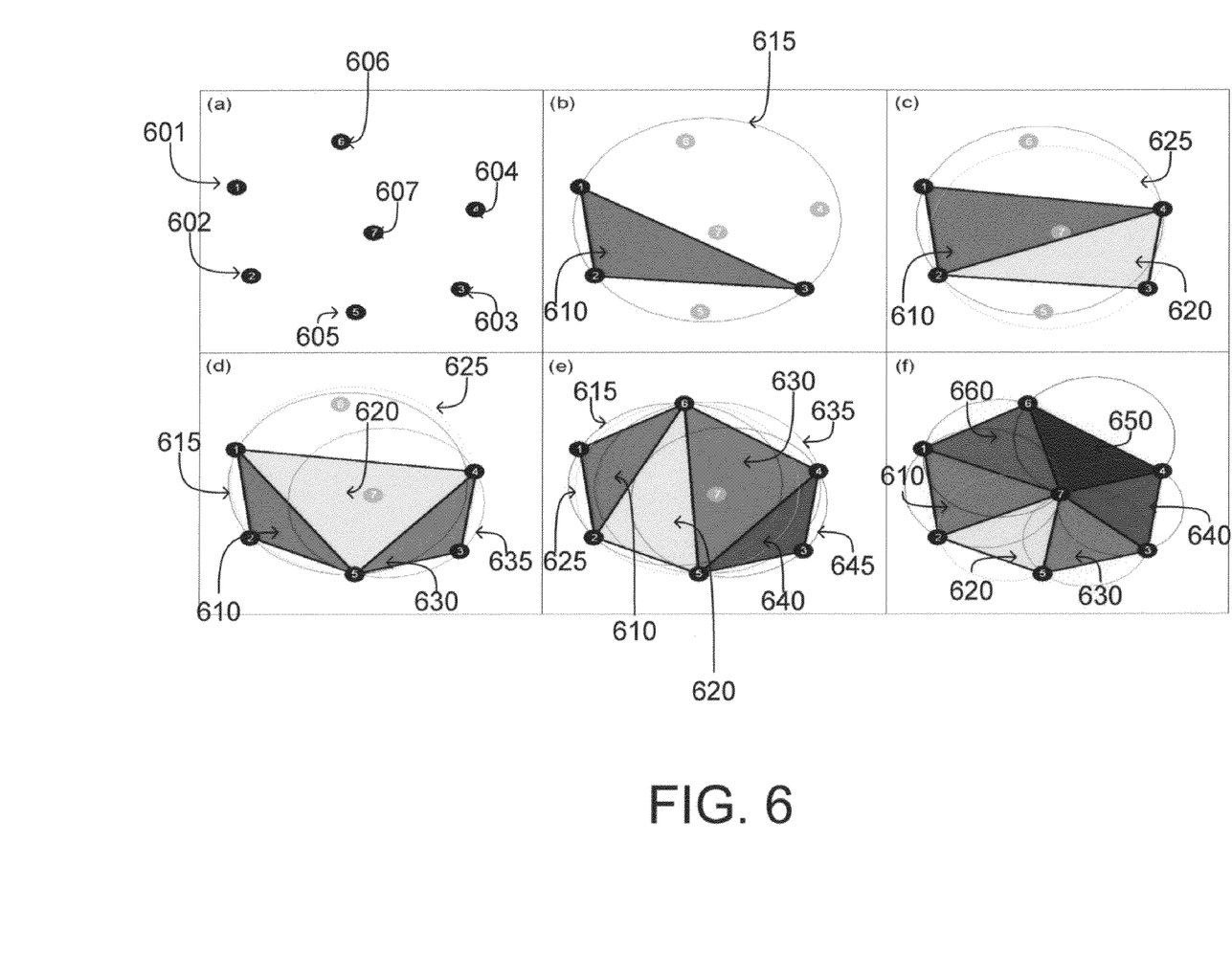
FIG. 6 is an example of generating elements from captured intersection points according to one embodiment of the present invention.

The element generation module 144 receives data from the path generation module 142 and generates one or more elements by associating different intersection points. Analysis of the generated elements is used to calculate airflow rate through the radiator. In an embodiment, the element generation module 144 connects intersection points using a triangulation method, generating a series of triangular elements having a plurality of intersection points as nodes. This series of triangular elements produces a mesh across the vehicle radiator based on the airflow pattern described by the pathlines. In one embodiment, the element generation module 144 uses Delauney triangulation to generate triangular elements by using circumscribed circles to connect the intersection. FIG. 6, described below, shows an example of the use of Delauney triangulation to generate elements. In other embodiments, other triangulation methods, such as Pitteway triangulation, are used to generate elements having intersection points as nodes. In an embodiment, the generated triangles do not overlap. In an embodiment, the element generation module 144 also performs a recursive algorithm based on one or more characteristics of the elements, such as the skew value of edge elements as discussed below in conjunction with FIG. 7, to remove ill-formed edge elements, removing edge elements that would not realistically contribute to airflow rate calculation, improving accuracy of the airflow analysis. For purposes of illustration, FIG. 8, described below, shows the triangular elements generated by the element generation module 144 on the radiator.

The analysis module 146 computes the airflow rate through the vehicle radiator using the elements formed by the element generation module 144 and pathline velocity magnitudes from the path calculation module 142. In an embodiment, the analysis module 146 computes the area of each element and computes the average of the velocity magnitudes associated with the pathlines corresponding to each intersection point in the element. The element area and average velocity magnitude are then used to determine the airflow rate through each element. The airflow rate of various elements is then used to determine the airflow rate for different regions of the radiator. For example, the analysis module 144 separately determines the airflow through regions of the radiator having a high density of pathlines originating from different cooling openings, showing the contribution of each cooling opening to airflow through the radiator. In an embodiment, the analysis module 146 also generates an image or other report describing the contribution of different cooling openings to airflow through the radiator which is displayed by the output device 130. The generated report allows a user to analyze airflow through the radiator and determine how different cooling openings affect radiator airflow. An example of an image or report produced by the analysis module 144 is described below in conjunction with FIG. 9.

In an embodiment, the computing device 100 further comprises a communication module 150 which links the computing device 100 to a network (not shown), or to other computing devices 100. The network may comprise a local area network (LAN), a wide area network (WAN) (e.g. the Internet), and/or any other interconnected data path across which multiple devices man communicate. In one embodiment, the communication module 150 is a conventional connection, such as USB, IEEE 1394 or Ethernet, to other computing devices 100 for distribution of files and information. In another embodiment, the communication module 150 is a conventional type of transceiver, such as for infrared communication, IEEE 802.11a/b/g/n (or WiFi) communication, Bluetooth® communication, 3 G communication, IEEE 802.16 (or WiMax) communication, or radio frequency communication.

It should be apparent to one skilled in the art that computing device 100 may include more or less components than those shown in FIG. 1 without departing from the spirit and scope of the present invention. For example, computing device 100 may include additional memory, such as, for example, a first or second level cache, or one or more application specific integrated circuits (ASICs). Similarly, computing device 100 may include additional input or output devices. In some embodiments of the present invention one or more of the components (110, 120, 130, 140, 142, 144, 146) can be positioned in close proximity to each other while in other embodiments these components can be positioned in geographically distant locations. For example the units in memory 140 can be programs capable of being executed by one or more processors 110 located in separate computing devices 100.

Figure 2:
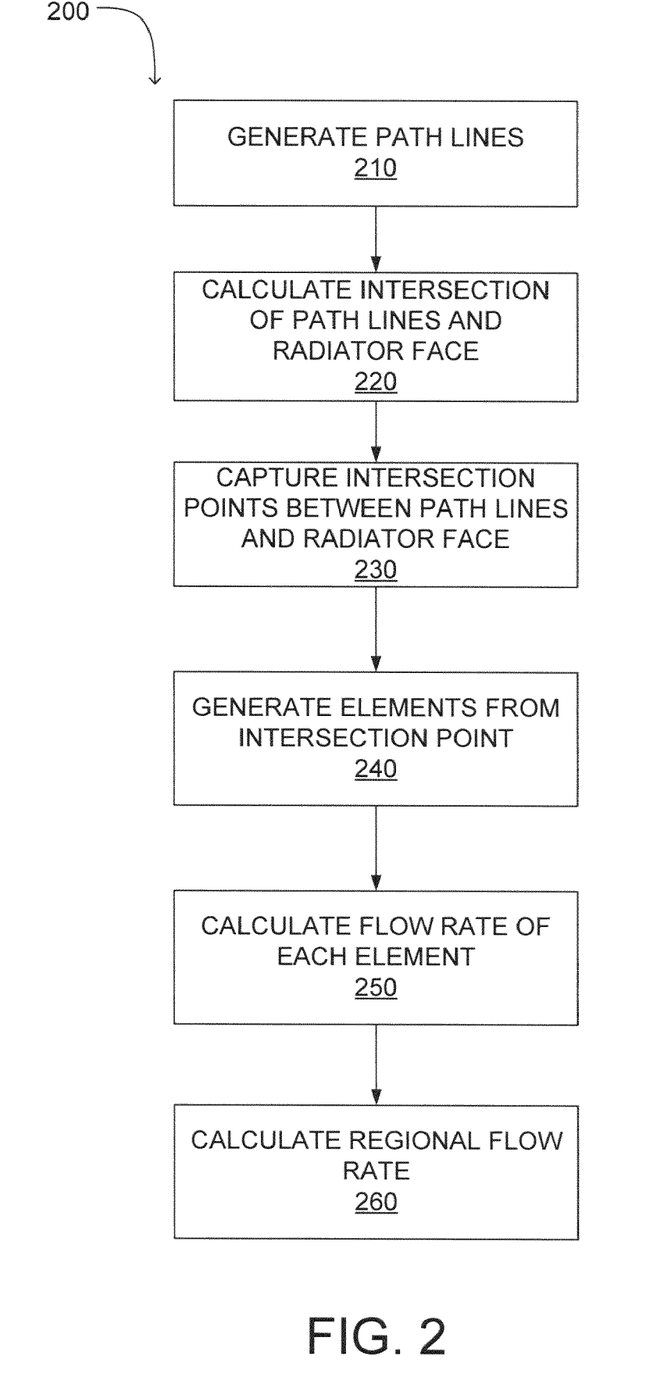
FIG. 2 is a flowchart illustrating a method for calculating airflow distribution through a vehicle radiator according to one embodiment of the present invention.

FIG. 2 is a flowchart illustrating a method 200 for calculating flow distribution through a vehicle radiator according to one embodiment of the present invention. In an embodiment, the steps of the method 200 are implemented by the processor 110 executing software or firmware instructions that cause the described actions. Those of skill in the art will recognize that one or more of the methods may be implemented in embodiments of hardware and/or software or combinations thereof. For example, instructions for performing the described actions are embodied or stored within a computer readable medium. Furthermore, those of skill in the art will recognize that other embodiments can perform the steps of FIG. 2 in different orders. Moreover, other embodiments can include different and/or additional steps than the ones described here.

Initially, the path calculation module 142 determines a CFD model associated with a vehicle front end. The CFD model describes airflow in and around the vehicle front end, which includes one or more cooling openings and an engine compartment. By using the CFD model to simulate airflow, the path calculation module 142 generates 210 pathlines describing airflow around and/or through the vehicle front end. Pathlines describing airflow through one or more cooling openings are identified. The pathlines indicating airflow through one or more cooling openings are analyzed to calculate 220 points on a vehicle radiator where the pathlines intersect the vehicle radiator. Hence, the calculated points describe how air from the cooling openings flows through the radiator. Coordinates and velocity magnitudes for each pathline are also calculated and stored, allowing identification of pathline origin and each pathline's contribution to airflow through the vehicle front end. In an embodiment, the analysis module 142 includes a description of the vehicle radiator size, shape and position within the engine compartment for calculation 220 of intersections between pathlines and the vehicle radiator. Alternatively, the path calculation module 142 receives a description of the radiator size, shape and position within the engine compartment from the input device 120, the communication module 150 or the memory 140. Hence, the pathlines allow for analysis of airflow through the radiator based on the results of the CFD analysis.

The points where the pathlines intersect the radiator face ("intersection points") are then captured 230 by the path calculation module 142. Each intersection point represents the intersection of a single pathline with the radiator, identifying pathlines describing airflow through the radiator. In an embodiment, the path calculation module 142 associates each intersection point with the cooling opening from which the pathline intersecting the radiator originated, permitting evaluation of how different cooling openings contribute to airflow through the radiator. In an embodiment, the intersection points are analyzed to determine the contribution of each cooling opening to airflow through the radiator. For example, the density of intersection points in different regions of the vehicle radiator from each cooling opening is analyzed and the cooling opening associated with the highest intersection point density in a region is associated with that region of the radiator. This shows how different cooling openings affect airflow through the radiator. In an embodiment, intersection points associated with a cooling opening having a low density of intersection points in a region are discarded to improve the accuracy of the analysis of a region of the radiator. Capturing 230 intersection points identifies airflow contribution from different pathlines, allowing data associated with those pathlines to be used in analyzing radiator airflow.

The element generation module 144 then generates 240 a plurality of elements from the captured intersection points. To generate 240 the elements, the element generation module 144 connects groups of intersection points with edges. In an embodiment, the element generation module 144 applies a Delaunay triangulation method to the intersection points, generating a plurality of triangular elements. Hence, Delaunay triangulation forms a mesh of triangular elements across the vehicle radiator having intersection points as nodes in the mesh. When Delauney triangulation is used, a triangular element is initially created from three intersection points and additional intersection points are added, causing re-triangulation of the initial element and generation 240 of one or more additional triangular elements including the additional intersection point. In an embodiment, created triangular elements do not overlap with other created triangular elements. Circumscribed circles including groups of intersection points along their circumferences are used for the re-triangulation. FIG. 6, described below, illustrates an example use of Delauney triangulation to generate 240 elements from a plurality of intersection points. After connecting the intersection points with edges, intersection points associated with two or fewer elements are identified and connected, forming a closed edge profile.

However, some generated edge elements may be ill-formed, so that their shape prevents them from realistically modeling airflow through the radiator. These ill-formed edge elements do not accurately contribute to airflow analysis and may decrease the overall accuracy of the radiator airflow analysis. In an embodiment, one or more element criteria are evaluated and elements are discarded based on the evaluation results. For example, a skew value describing element area is calculated for each element and used to identify elements for removal. The skew value is the ratio of the area of the generated element to the area of an ideal element, defined as the area of an isosceles triangle within the circumscribed circle which includes the generated element. For example, the skew value associated with an element is compared to a threshold value, such as 0.80, and elements associated with a skew value less than the threshold are removed. An example of skew calculation is described below in conjunction with FIG. 7.

The analysis module 146 then calculates 250 the flow rate of each generated element to determine the contribution of each element to airflow through the radiator. To calculate 250 the flow rate of each element, the element area is multiplied by the average velocity of air flowing through the element. The average velocity of air flowing through the element is determined by analyzing the stored velocity magnitude of the pathlines associated with the intersection points included by the element to generate an average velocity associated with the element. For example, when an element is a triangular element, the velocity magnitudes of each intersection point that is a node of the triangular element are averaged and the average velocity magnitude is associated with the element. Multiplying the element area by the average velocity magnitude yields the airflow rate through the element.

Figure 9:
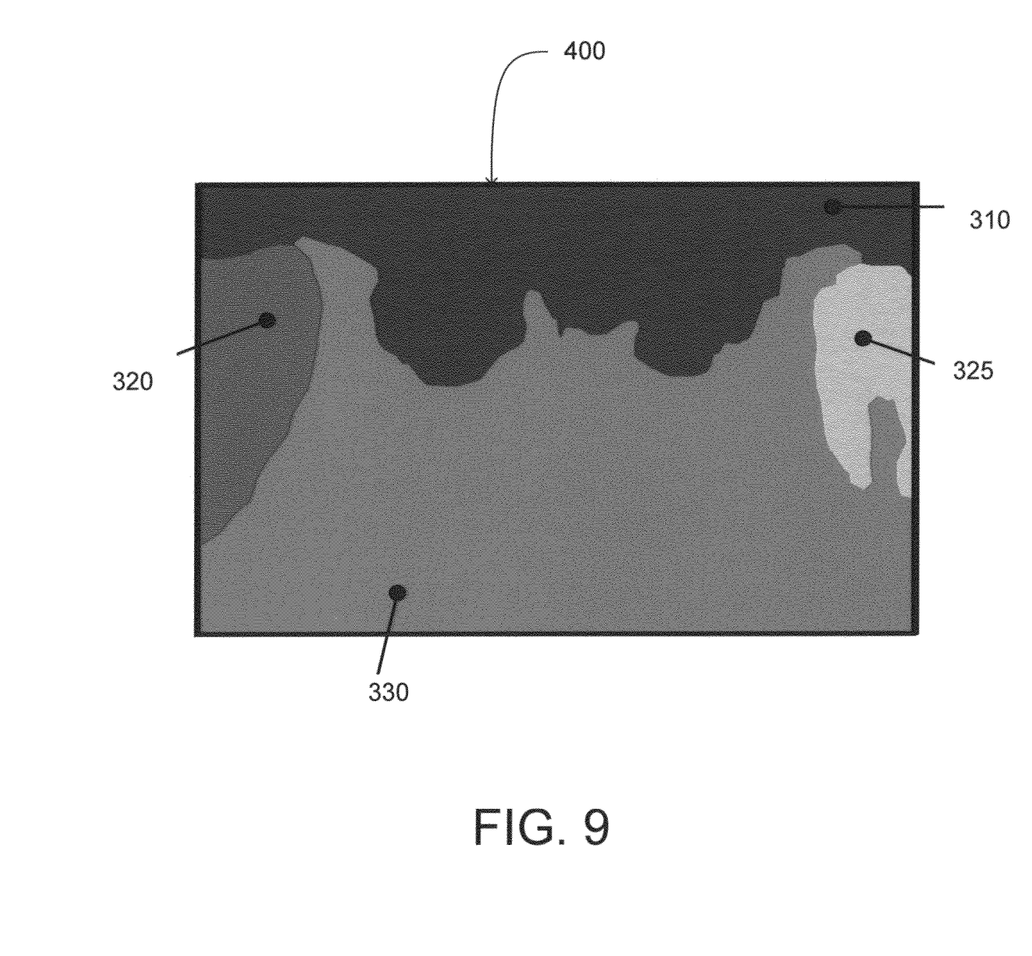
FIG. 9 is an example report describing airflow through a radiator face according to one embodiment of the present invention.

The airflow rate through a plurality of elements is then summed by the analysis module 146 to calculate 260 the airflow rate through a region of the radiator or through the entire radiator. In an embodiment, the radiator is partitioned into a plurality of regions and the airflow rate through each region is individually calculated 260 from the elements within each region. For example, the radiator is partitioned into regions corresponding to the density of intersection points from a cooling opening, segmenting the radiator into regions having airflow from a specific cooling opening. The calculated airflow rate is then used to generate a report describing airflow through the radiator. In an embodiment, the report is an image visually identifying airflow contributions from each cooling opening or identifying airflow through different regions of the radiator. This simplifies analysis of radiator airflow by identifying how each cooling opening, or region, affects airflow through the radiator. An example of the generated report is shown in FIG. 9. Alternatively, the report is a textual description of airflow through the radiator or a description of the airflow from different cooling openings through the radiator.

Figure 3:
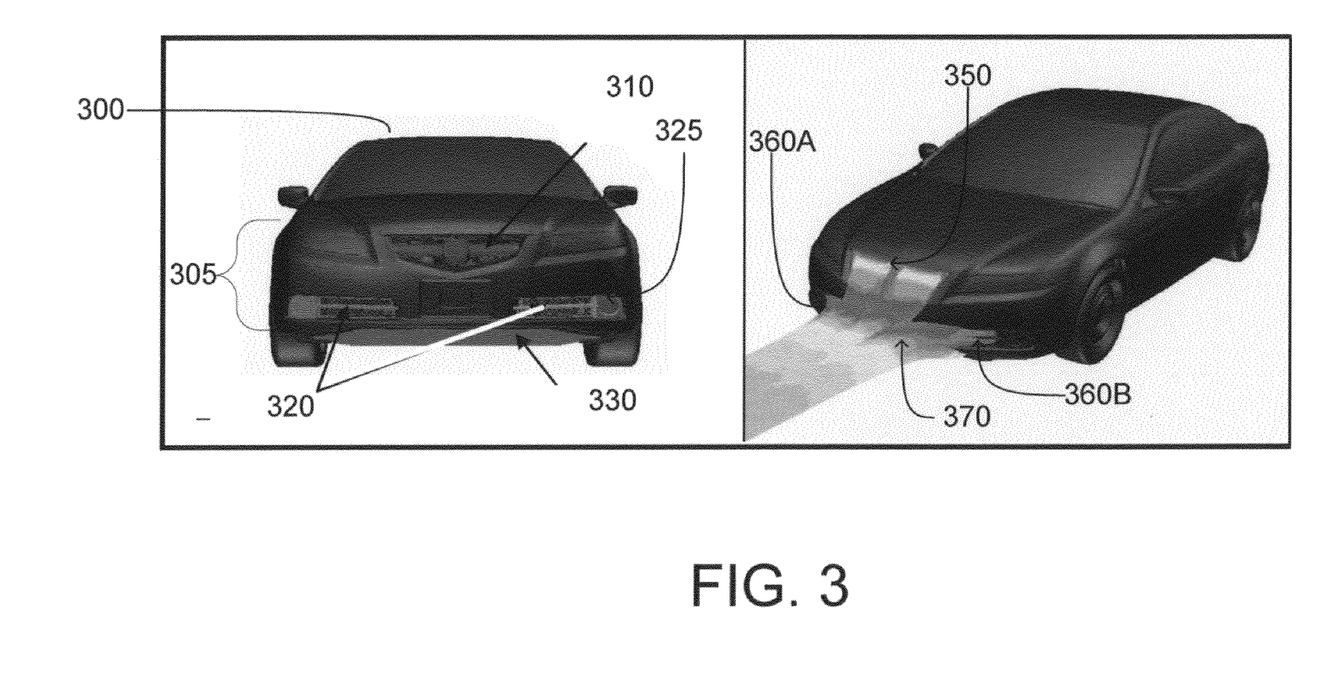
FIG. 3 is an example of generation of pathlines describing airflow through a vehicle front end according to one embodiment of the present invention.

FIGS. 3 and 4 show examples of pathlines showing airflow around and/or through a vehicle 300 generated by the path calculation module 142. As shown in FIG. 3, the vehicle 300 includes a front end 305 located below the hood and above the tires. The front end 305 includes one or more cooling openings allowing air to flow from outside the vehicle into an engine compartment which is posterior to the vehicle front end 305. Hence, air from outside the vehicle 300 flows into the vehicle engine compartment through the cooling openings of the vehicle front end 305 to aid in cooling the engine while the vehicle moves. In the example of FIG. 3, the vehicle front end 305 includes multiple cooling openings, an upper grille 310, a lower right grille 320, a lower left grille 325 and a lower breather 330. For clarity, FIG. 3 associates a color with each cooling opening, using blue to indicate the upper grille 310, green to indicate the lower right grille 320, yellow to identify the lower left grille 330 and pink to identify the lower bottom breather 330.

FIG. 3 also shows an example of generated pathlines 350, 360A, 360B and 370 showing airflow through the cooling openings. As the vehicle 300 moves, air travels through the cooling openings and into the engine compartment. After flowing into the engine compartment, air flows through a radiator which transfers heat from coolant inside the radiator to the flowing air. FIG. 3 identifies the pathlines 350, 360A, 360B and 370 illustrating airflow through the cooling openings. In an embodiment, the path calculation module 142 uses computational fluid dynamics (CFD) analysis to generate the pathlines describing airflow. Use of CFD analysis allows rapid and accurate generation of pathlines and simplifies regeneration of pathlines corresponding to modifications of cooling opening design or vehicle velocity. As airflow affects heat reduction in the engine compartment by altering heat transfer by the radiator, analysis of the pathlines 350, 360A, 360B and 370 shows how cooling opening placement and shape affect engine compartment cooling. Hence, the path calculation module 142 determines and stores the velocity of each pathline traveling through the cooling openings to analyze how various cooling openings contribute to airflow through the radiator and affect engine compartment cooling.

FIG. 4 shows pathlines describing airflow from cooling openings to a radiator 400. While FIG. 3 illustrates pathlines entering one or more cooling openings in the vehicle front end 305, FIG. 4 shows example pathlines describing airflow from the cooling openings to the radiator 400. FIG. 4 shows an example of how airflow through the radiator 400 is affected by pathlines from the cooling openings.

FIG. 4 shows the position of the upper grille 310, lower left grille 325, lower right grille 320 and bottom breather 330 relative to the radiator 400 in an example configuration. As shown in FIG. 4, airflow from the upper grille 310, lower left grille 325, lower right grille 320 and lower breather 330 travels through the radiator 400. The pathlines 350, 360A, 360B and 370 originate outside the vehicle, flow through the various cooling openings and intersect the radiator 400. In an embodiment, the pathlines 350, 360A, 360B and 370 are associated with the cooling opening from which the pathlines 350, 360A, 360B and 370 originate, allowing the contribution of each cooling opening to airflow to be identified and analyzed. In the example of FIG. 4, pathline 350 originates from the upper grille 310, pathline 360B originates from the lower left grille 325, pathline 360A originates from the lower right grille 330 and pathline 370 originates from the bottom breather 330. Because the radiator 400 transfers heat from coolant flowing within the radiator 400 to air flowing through the radiator 400, airflow from the cooling openings affects how efficiently the radiator 400 dissipates heat from the coolant to the air. Preventing a static buildup of heated air adjacent to the radiator 400 improves heat transfer, allowing more efficient reduction of coolant temperature and more efficiently reducing engine temperature. Hence, analyzing velocity magnitudes associated with pathlines 350, 360A, 360B and 370 allows determination of how airflow from different cooling openings affects airflow through the radiator 400.

Figure 5:
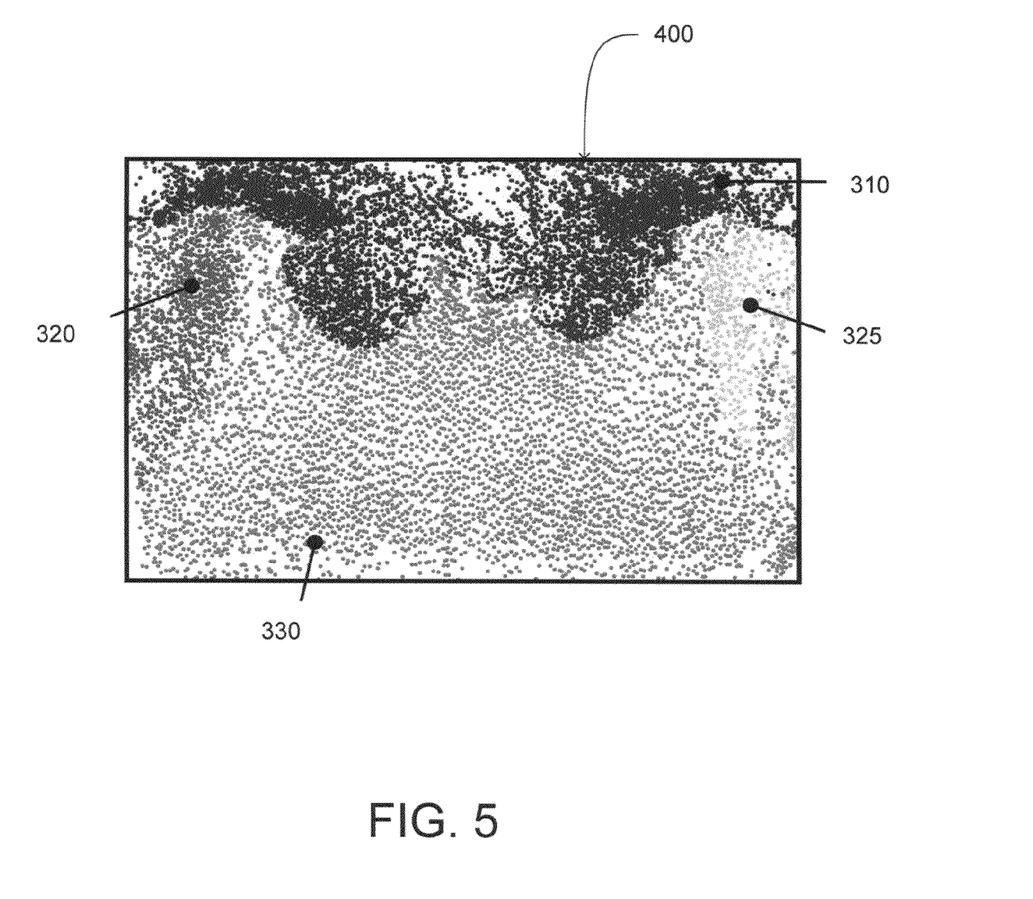
FIG. 5 is an example of captured intersection points between pathlines and a vehicle radiator according to one embodiment of the present invention.

FIG. 5 shows an example of intersection points showing intersection between pathlines from one or more cooling openings and a radiator 400. The pathlines initially generated by the path calculation module 142 describe air flow through the cooling openings and the vehicle engine compartment as a whole, certain pathlines may not contribute to airflow through the radiator 400. For example, air may flow through the cooling openings and into the engine compartment but flow to the side of the radiator 400. As pathlines that do not intersect the radiator 400 have little effect on airflow through the radiator so data associated with these non-intersecting pathlines is not beneficial to analysis of airflow through the radiator 400.

Hence, the path calculation module 142 also identifies pathlines intersecting the radiator 400. In an embodiment, the path calculation module 142 stores or receives data describing the position of the radiator 400 within the vehicle engine compartment and the size and shape of the radiator 400. Using this description, the path calculation module 142 identifies pathlines intersecting with the radiator 400. The path calculation module 142 stores the points where pathlines intersect with the radiator 400, or "intersection points." In addition to specifying a pathline intersecting the radiator 400, the intersection points also indicate the location on the radiator 400 where the pathline intersects the radiator 400.

In an embodiment, the path generation module 142 also associates pathlines with the cooling opening from which the pathlines entered the engine compartment. This association between pathline and originating cooling opening allows the intersection points to describe how each cooling opening contributes to airflow through the radiator 400. For example, the intersection points permit identification of regions of the radiator 400 where the majority of the airflow originates from a particular cooling opening. In FIG. 5, the cooling opening associated with the intersection points is identified for four different regions of the radiator. In the example of FIG. 5, the upper grille 310 is the source of the intersection shown in blue, and the lower right grille 320 is the origin of the intersection points shown in green. The intersection points shown in yellow originate from the lower left grille 325 while the intersection points presented in pink originate from the bottom breather 330. Thus, as shown in the example of FIG. 5, the intersection points show how different cooling openings contribute to airflow through the radiator 400.

FIG. 6 shows an example of element generation from captured intersection points according to an embodiment of the invention. For purposes of illustration, the example shown in FIG. 6 includes seven intersection points 601, 602, 603, 604, 605, 606, 607 used to generate elements. However, elements may be generated from any number of intersection points. Additionally, FIG. 6 illustrates element generation using Delauney triangulation; however, in other embodiments other triangulation methods or element generation methods may be applied to the intersection points.

Initially, three intersection points 601, 602, 603 are identified. These three intersection points 601, 602, 603 are used to form the first element 610. In Delauney triangulation, circumscribed circles including groups of intersection points are used. The circumscribed circles include the intersection points being connected but do not include additional intersection points not being connected. Hence, when intersection points 601, 602 and 603 are to be connected, a circle 615 is generated which includes intersection points 601, 602, 603 along the circumference of the circle 615 and edges are formed within the circle 615 connecting intersection points 601, 602, 603 to generate element 610.

As subsequent intersection points, such as intersection point 604, are included in the triangulation, previously formed elements are re-generated using additional circumscribed circles so that the elements best fit the group of intersection points. If the next point added to the triangulation, such as intersection point 604 in FIG. 6, is within the circle 615 which includes the original intersection points 601, 602, 603, the original element 615 is re-triangulated to account for additional intersection point 604 in circle 615 and element 620 is generated including intersection points 602, 603 and 604. Similarly, when intersection point 605 is included in the element generation process, circle 625, having intersection points 601, 605 and 604 on its circumference, and circle 635 having intersection points 603, 604 and 605 on its circumference, are generated. Edges within circle 625 are then generated to connect intersection points 601, 605 and 604, re-triangulating element 620. Similarly, intersection points 603, 604 and 605 are connected by edges included in circle 635 to generate element 630.

Re-triangulation of elements is further shown when intersection point 606, which is included in circles 615 and 625, is included in the triangulation. By adding intersection point 606 to the element generation process, circles 615, 625 and 635 are modified so that groups of intersection points are included along the circumference of each of circles 615, 625, 635 but intersection points are not within any of circles 615, 625, 635. Hence, circle 615 is modified to include intersection points 601, 606 and 602 on its circumference while circle 625 is modified to include intersection points 602, 605, 606 on its circumference. Similarly, circle 635 is altered to include intersection points 604, 605, 606 on its circumference. Hence, existing circles 615, 625, 635 are modified when a new intersection point, such as intersection point 606, is added so that no circle includes intersection points within the area of the circle, but includes intersection points along the circumference of the circle. New circle 645 is generated including intersection points 603, 604, 605 on its circumference and used to generate element 640. A similar modification of circles 615, 625, 635 and 645 is performed when intersection point 607 is included in the element generation, causing modification of elements 610, 620, 630 and 640 and generation of new elements 650 and 660.

Hence, using Delauney triangulation to generate elements creates multiple triangular elements having intersection points as nodes and not including intersection points within the area of the element. Hence, the intersection points are endpoints, or nodes, of the edges defining boundaries of the elements. The triangular elements are then analyzed and intersection points included in no more than two elements are identified and connected, forming a closed edge profile. In the example of FIG. 6, intersection point 607 is included in six elements as it is a node in elements 601, 620, 630, 640, 650 and 660 so it is not classified as an edge point. However, intersection point 601 is an edge element as it is a node in elements 610 and 660. Hence, the generated elements allow formation of a closed edge profile.

Figure 7:
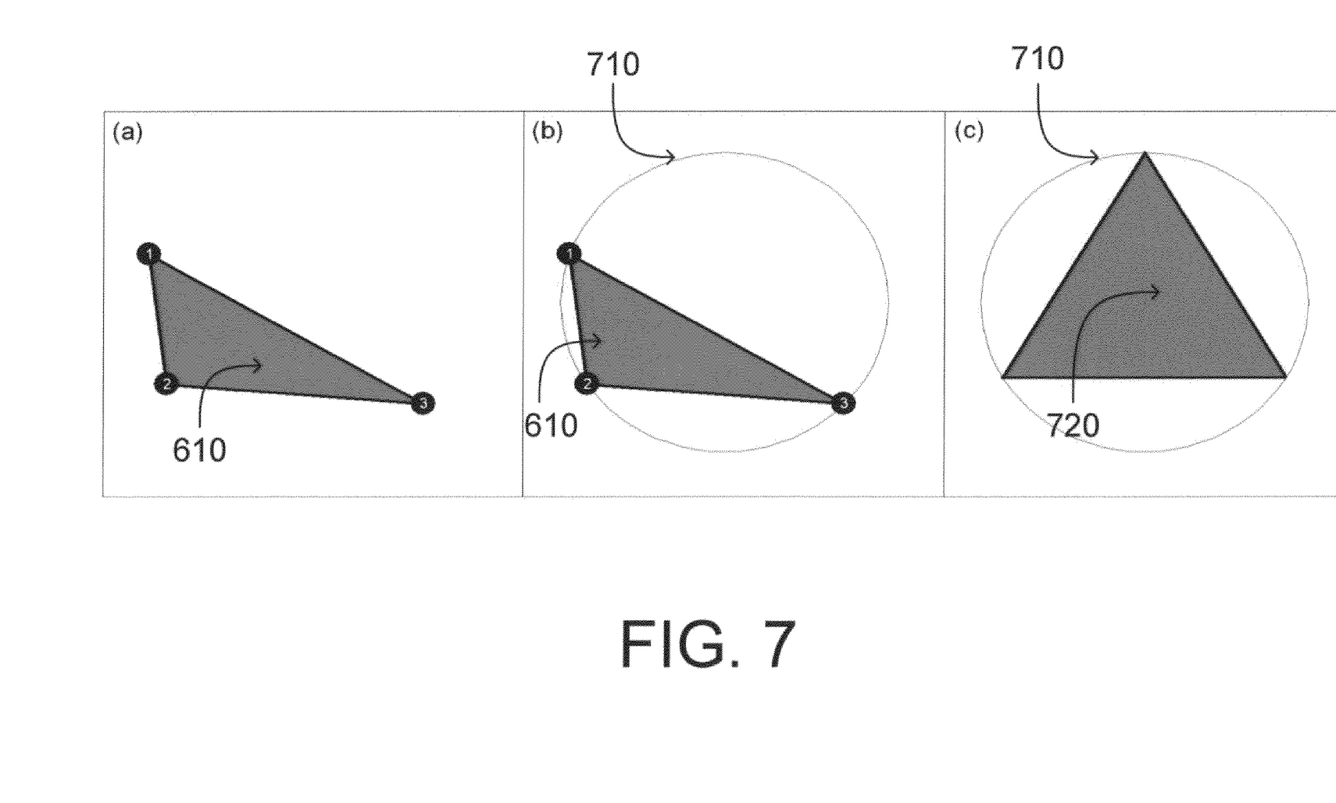
FIG. 7 is an example of calculating a skew value associated with a generated element according to one embodiment of the present invention.

As intersection points can form irregularly shaped edge elements that do not realistically contribute data to airflow calculation, in an embodiment, an algorithm is applied to the generated elements to identify and remove irregularly formed elements. One criterion for identifying ill-formed elements is skew value. An example of skew value calculation is shown in FIG. 7.

Skew value provides a relationship between the area of a generated element to the area of a hypothetical ideal element. For purposes of illustration, element 610 is shown in FIG. 7 to illustrate calculation of a skew value associated with element 610. As described above in conjunction with FIG. 6, element 610 is generated by first creating a circle 710 having a plurality of intersection points on its circumference. Connecting these intersection points using edges in the area of the circle 710 forms element 610.

As skew value indicates the relationship between the generated element 610 and an ideal element, the ideal element 720 is also calculated. In an embodiment, circle 710 is used to determine the ideal element 720. Ideal element 720 is an isosceles triangle whose edges are included in the area of circle 710. Hence, circle 710 generates both element 610 and the ideal element 710. The skew value is then determined by calculating the ratio of the area of element 610 to the area of the ideal element 710. To improve airflow analysis, edge elements having a skew value less than a specified threshold, such as 0.80, are discarded as they do not contribute accurate data to airflow calculation. This causes airflow calculation to include those elements having a large enough area to contribute to airflow and disregards elements having areas too small to effectively contribute to airflow calculation.

Figure 8:
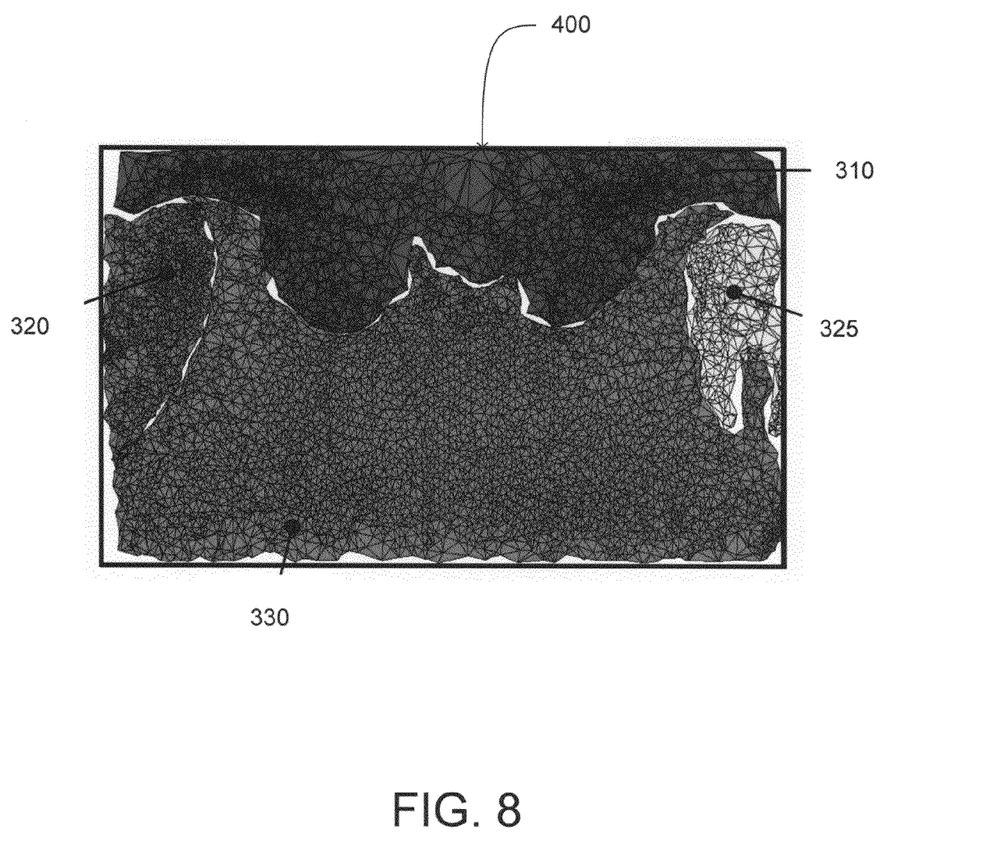
FIG. 8 is an example showing generated elements within a radiator according to one embodiment of the present invention.

Hence, the elements generated from the intersection points form a mesh covering the radiator 400. FIG. 8 shows an example of the generated elements on a vehicle radiator 400. FIG. 8 also shows the relationship between the generated elements and the various cooling openings—the upper grille 310, lower left grille 325, lower right grille 320 and lower breather 330 in an example configuration. Hence, FIG. 8 shows the elements associated with airflow through the radiator originating from the upper grille 310, lower left grille 325, lower right grille 320 and bottom breather 330. In an embodiment, the elements are associated with the cooling opening from which the intersection points used to form the elements originated, allowing evaluation of how different cooling openings contribute to airflow through the radiator 400. The various elements allow for analysis of the velocity of air flowing from different cooling openings through the radiator 400. Because the radiator transfers heat from coolant flowing within the radiator 400 to air flowing through the radiator 400, determining how different cooling openings affect airflow through the radiator 400 provides information about how to modify the position or shape of various cooling openings to increase radiator 400 airflow.

The generated elements are used to calculate airflow through one or more regions of the radiator 400 or through the radiator as a whole. By summing the airflow rate through multiple elements, total airflow through one or more regions of the radiator is determined. If the radiator 400 is partitioned into various regions, the contribution of each region to airflow through the radiator can be determined by summing the airflow rate of elements within a region. This data is then used to generate a report describing how various regions contribute to airflow through the radiator.

In one embodiment, the report is an image showing a visual representation of the radiator 400 with the airflow contribution of various regions visually distinguished from each other, such as the image shown in FIG. 9. In the example shown in FIG. 9, an image of the radiator 400 is generated with airflow originating from different cooling openings, the upper grille 310, lower left grille 325, lower right grille 320 and bottom breather 330 identified. This type of graphical report allows for rapid identification of how different cooling openings contribute to airflow through the radiator 400. Alternatively, a text based report is produced describing the percentage of airflow through the radiator originating from different cooling openings to provide quantitative data describing how different cooling openings contribute to airflow through the radiator.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A computer-based method for analyzing airflow through a radiator of a vehicle, the method comprising the steps of:
generating a plurality of pathlines, each pathline describing airflow of fluid moving through a vehicle front end and into the vehicle, each pathline including a position identifier and a velocity magnitude;
calculating a plurality of intersection points, each intersection point identifying a pathline intersecting the radiator in the vehicle and a location on the radiator where the pathline intersects the radiator;
generating one or more elements from the plurality of intersection points;
calculating a flow rate associated with each element using the velocity magnitude included in the pathline identified the intersection points included in an element;
generating a report describing a regional flow rate based on the flow rate associated with a plurality of elements; and
storing the report in a computer readable storage medium.

2. The method of claim 1, wherein the step of generating the plurality of pathlines comprises the steps of:
generating a computational fluid dynamics model of the vehicle front end;
determining a velocity associated with the vehicle front end; and
solving the computational fluid dynamic module of the vehicle front end based on the velocity associated with the vehicle front end.

3. The method of claim 1, wherein the step of generating one or more elements from the plurality of intersection points comprises the step of:
applying a triangulation method to a group of three intersection points.

4. The method of claim 3, wherein the triangulation method comprises Delauney triangulation.

5. The method of claim 3, further comprising the steps of:
identifying an additional intersection point; and
applying the triangulation method to the group of three intersection points and the additional intersection point.

6. The method of claim 1, wherein the step of generating one or more elements from the plurality of intersection points comprises the steps of:
comparing a metric associated with a generated edge element to a threshold value; and
responsive to the threshold value being greater than the metric associated with the generated element, removing the generated element.

7. The method of claim 6 wherein the metric associated with the generated edge element comprises a skew value describing associated with an area of the generated element.

8. The method of claim 1, wherein the step of calculating the flow rate associated with each element comprises the steps of:
computing an area associated with an element;
identifying the intersection points included in the element;
determining a pathline associated with each identified intersection point;
determining an element velocity by computing an average velocity of the velocity magnitudes associated with the pathlines associated with each identified intersection point; and
generating an element flow rate by multiplying the area associated with the element and the element velocity.

9. The method of claim 1, wherein each pathline includes a cooling opening identifier, the cooling opening identifier associating a pathline with a cooling opening from which the pathline originates.

10. The method of claim 9, wherein the step of generating the report describing a regional flow rate comprises the steps of:
identifying elements including intersection points associated with pathlines having a first cooling opening identifier;
calculating a flow rate associated with each element including intersection points associated with pathlines having the first cooling opening identifier; and generating a flow value associated with the first cooling opening identifier by summing the flow rates associated with each element including intersection points associated with pathlines having the first cooling opening identifier.

11. The method of claim 1, wherein the report comprises an image having a visual depiction of the radiator and the regional flow rate superimposed on the visual depiction of the radiator.

12. The method of claim 1, wherein the report comprises text data describing the regional flow rate.

13. The method of claim 1, wherein the one or more elements comprise one or more non-overlapping triangular elements.

14. A computer program product, comprising a computer readable storage medium storing computer executable code for analyzing airflow through a radiator of a vehicle, the computer executable code performing the steps of:
generating a plurality of pathlines, each pathline describing airflow of fluid moving through a vehicle front end and into the vehicle, each pathline including a position identifier and a velocity magnitude;
calculating a plurality of intersection points, each intersection point identifying a pathline intersecting the radiator in the vehicle and a location on the radiator where the pathline intersects the radiator;
generating one or more elements from the plurality of intersection points;
calculating a flow rate associated with each element using the velocity magnitude included in the pathline identified the intersection points included in an element;
generating a report describing a regional flow rate based on the flow rate associated with a plurality of elements; and
storing the report in a computer readable storage medium.

15. The computer program product of claim 14, wherein the step of generating the plurality of pathlines comprises the steps of:
generating a computational fluid dynamics model of the vehicle front end;
determining a velocity associated with the vehicle front end; and
solving the computational fluid dynamic module of the vehicle front end based on the velocity associated with the vehicle front end.

16. The computer program product of claim 14, wherein the step of generating one or more elements from the plurality of intersection points comprises the step of:
applying a triangulation method to a group of three intersection points.

17. The computer program product of claim 16, wherein the triangulation method comprises Delauney triangulation.

18. The computer program product of claim 16, further comprising the steps of:
identifying an additional intersection point; and
applying the triangulation method to the group of three intersection points and the additional intersection point.

19. The computer program product of claim 14, wherein the step of generating one or more elements from the plurality of intersection points comprises the steps of:
comparing a metric associated with a generated edge element to a threshold value; and
responsive to the threshold value being greater than the metric associated with the generated element, removing the generated element.

20. The computer program product of claim 19, wherein the metric associated with the generated edge element comprises a skew value describing associated with an area of the generated element.

21. The computer program product of claim 14, wherein the step of calculating the flow rate associated with each element comprises the steps of:
computing an area associated with an element;
identifying the intersection points included in the element;
determining a pathline associated with each identified intersection point;
determining an element velocity by computing an average velocity of the velocity magnitudes associated with the pathlines associated with each identified intersection point; and
generating an element flow rate by multiplying the area associated with the element and the element velocity.

22. The computer program product of claim 14, wherein each pathline includes a cooling opening identifier, the cooling opening identifier associating a pathline with a cooling opening from which the pathline originates.

23. The computer program product of claim 22, wherein the step of generating the report describing a regional flow rate comprises the steps of:
identifying elements including intersection points associated with pathlines having a first cooling opening identifier;
calculating a flow rate associated with each element including intersection points associated with pathlines having the first cooling opening identifier; and
generating a flow value associated with the first cooling opening identifier by summing the flow rates associated with each element including intersection points associated with pathlines having the first cooling opening identifier.

24. The computer program product of claim 14, wherein the report comprises an image having a visual depiction of the radiator and the regional flow rate superimposed on the visual depiction of the radiator.

25. The computer program product of claim 14, wherein the report comprises text data describing the regional flow rate.

26. The computer program product of claim 14, wherein the one or more elements comprise one or more non-overlapping triangular elements.

* * * * *